(12) United States Patent
Shepshelovich et al.

(10) Patent No.: US 7,992,827 B2
(45) Date of Patent: Aug. 9, 2011

(54) WINGS FOR AIRCRAFT (75) Inventors: Michael Shepshelovich, Ganey Tikva (IL); Alex Nagel, Petach Tikva (IL)

(73) Assignee: Israel Aerospace Industries Ltd., Lod (IL)

( * ) Notice: Subject to any disclaimer, the term of this patent is extended or adjusted under 35 U.S.C. 154(b) by 918 days.

(21) Appl. No.: 11/802,139

(22) Filed: May 21, 2007

(65) Prior Publication Data
US 2007/0278353 A1    Dec. 6, 2007

(30) Foreign Application Priority Data

May 30, 2006 (IL) .......................................... 176022

(51) Int. Cl.
*B64C 3/50* (2006.01)
*B64C 3/14* (2006.01)
(52) U.S. Cl. ........................ 244/215; 244/35 R; 244/217
(58) Field of Classification Search ................ 244/35 R, 244/198, 201, 204, 213, 215, 216, 217, 218, 244/219, 45 R
See application file for complete search history.

(56) References Cited

U.S. PATENT DOCUMENTS

| 4,072,282 | A | 2/1978 | Fulker et al. |
| 6,382,921 | B1 | 5/2002 | Selig et al. |
| 6,607,164 | B2 | 8/2003 | Somers |
| 7,048,228 | B2 | 5/2006 | Vassberg et al. |

FOREIGN PATENT DOCUMENTS

GB            605765          7/1948

OTHER PUBLICATIONS

Nagel et al., The Concept of High-Lift, Mild Stall Wing, 2004, ICAS.*

* cited by examiner

*Primary Examiner* — Joshua J Michener
(74) *Attorney, Agent, or Firm* — The Nath Law Group; Susanne M. Hopkins; William L. Klima (57) ABSTRACT

A wing for an aircraft is provided, including at least a first wing portion configured for providing high-lift mild stall characteristics at least at Reynolds numbers in the range between about $0.3*10^6$ and about $2.0*10^6$, and at least a second wing portion comprising a substantially permanently slotted aerofoil arrangement. Also provided are an air vehicle including such wings, a method for operating an aircraft, and a method for designing an aircraft wing.

36 Claims, 9 Drawing Sheets

WINGS FOR AIRCRAFT

FIELD OF THE INVENTION

This invention relates to wing configurations for fixed wing aircraft, in particular to high-lift wings therefor.

BACKGROUND OF THE INVENTION

In many types of aircraft, particularly fixed wing aircraft, it is standard practice to avoid flying, under aerodynamically generated lift, at velocities close to stall airspeeds. This practice is even more strictly adhered to in the case for unmanned air vehicles (UAV), and improves safety and minimizes risk of loss or damage to the air vehicles, which can occur when losing aerodynamic control thereof.

However, this practice also results in a restriction in the operation of the air vehicle, particularly UAV's, to above a specified airspeed (which includes a speed safety margin imposed on stall airspeed), reducing operation in an otherwise allowable part of the flight envelope. The limitation is especially relevant for the flight and take-off/landing phases of small and medium size UAV flying at reduced airspeeds in windy air, and is also applicable to other aircraft For such cases, reducing the specified airspeed (which may be accompanied by an increased angle of attack to maximize lift) eventually leads to stall of the wings and loss of aileron's aerodynamically generated controlling forces, and may produce uncontrollable dynamic response of the aircraft, leading to the development of spin modes that are difficult to recover from, particularly in the case of unmanned air vehicles. In particular, there is often a fast variation in aerodynamic characteristics of the aircraft at stall and post-stall angles of attack that are highly unstable/unreliable and are difficult to predict, and which render the aircraft (specially UAV's) difficult to control in flight. The actual speed safety margin (to avoid the stall flight regime) imposed on aircraft operation is often dependent on stall pattern of the wing and may vary, depending on specific case and required flight conditions, and the standard speed safety margin adopted for UAV operations is: $V_{flight} \geq 1.2 V_{stall}$.

Stall characteristics for subsonic-type wings or aerofoils may be classified as follows:

Abrupt stall is characterized by the fast drop of the lift at stall angle of attack, typically resulting in an approximate 20-50% loss of lift coefficient within about 1° to about 3° after the stall angle of attack, depending on the level of maximum lift (e.g., moderate or high lift wings). This type of stall is associated with flow separation at the leading edge of the wing (leading edge stall), or, with very fast progress of trailing edge separation Moderate stall is characterized by the gradual development of trailing edge separation at the stall of the wing and moderate loss of the lift at post-stall angles of attack, typically resulting in a rate of loss of lift coefficient at post-stall angles of attack that is approximately close to the rate or slope of lift coefficient gain prior to the stall angle of attack, but of opposite slope thereto. This type of stall is associated with moderate progress of trailing edge separation at post-stall angles of attack.

Mild stall is characterized by almost constant level of the lift at post-stall domain and is associated with slowly creeping trailing edge separation that moderates the rate of lift losses at high angles of attack, typically resulting in an approximately constant lift coefficient (within about 10% of the maximum lift coefficient for at least about 5° after the stall angle of attack).

The stall angle of attack may be defined as the angle of attack at which maximum lift coefficient (or up to about 99% of maximum lift coefficient) is first realized. The stalling speed is dependent on the weight (W) of the air vehicle, maximum lift coefficient ($C_{l\ max}$), wing area ($S_w$), and air density ($\rho$), and is generally defined as $$V_{stall}=(2W/(\rho^* C_{Lmax}^* S_w))0.5$$

Figure 1:
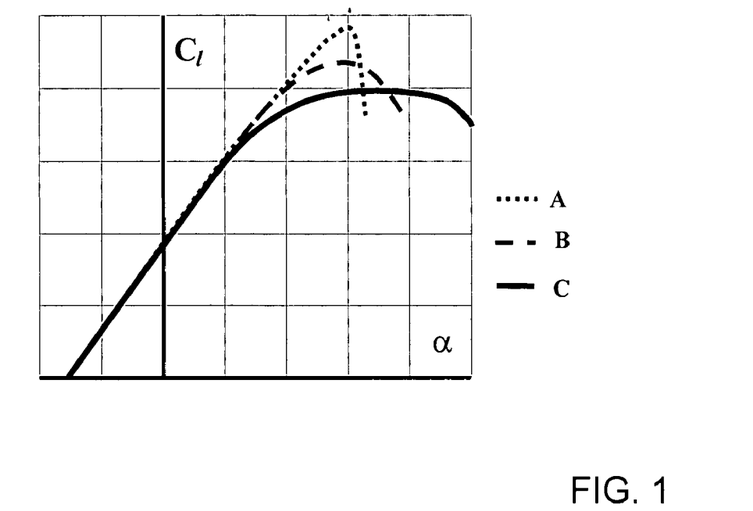
FIG. 1 schematically illustrates typical stall patterns of some types of wing sections or aerofoils.

These three types of stall are diagrammatically illustrated in FIG. 1 as curves A, B and C, respectively.

Figures 4A, 5A:
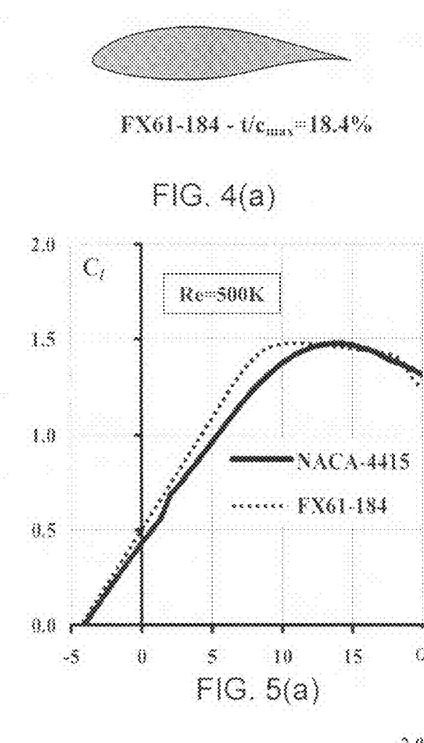
FIGS. 4(a) and 4(b) illustrate conventional mild-stall airfoils with moderate maximum lift, airfoils FX61-184 and NACA-4415, respectively.
FIG. 5(a) illustrates lift coefficient distributions with angle of attack for conventional airfoils FX61-184 and NACA-4415 at Re=0.5*10$^6$.
Figures 4B, 5B:
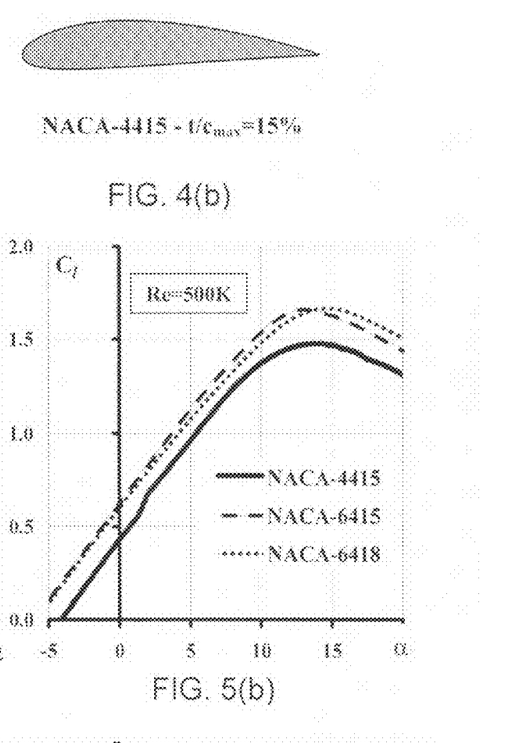
FIG. 5(b) illustrates lift coefficient distributions with angle of attack for conventional airfoils NACA-4415, NACA-6415 and NACA-6418 at Re=0.5*10$^6$.

By way of example, two conventional mild stall airfoils FX61-184 and NACA-4415. i.e., known aerofoils having mild stall characteristics, are illustrated in FIGS. 4(a) and 4(b), and their lift coefficients are compared in FIG. 5(a). The possible effects of variation of camber and thickness in maximum lift of the NACA-4415 aerofoil are illustrated in FIG. 5(b) (i.e., in comparison with NACA aerofoils 6415 and 6418, respectively).

Stall characteristics also tend to deteriorate as maximum lift is increased, resulting in more difficulties when attempting to comply with considerations of flight safety and to avoid unfavorable stall patterns. This is especially relevant for high-lift, long endurance wings of some UAV, such as for example the HERON high-lift long endurance UAV, manufactured by Israel Aircraft Industries, Israel. In the HERON, optimum endurance performance is via high loitering lift coefficients, which requires high maximum lift.

Figure 3A:
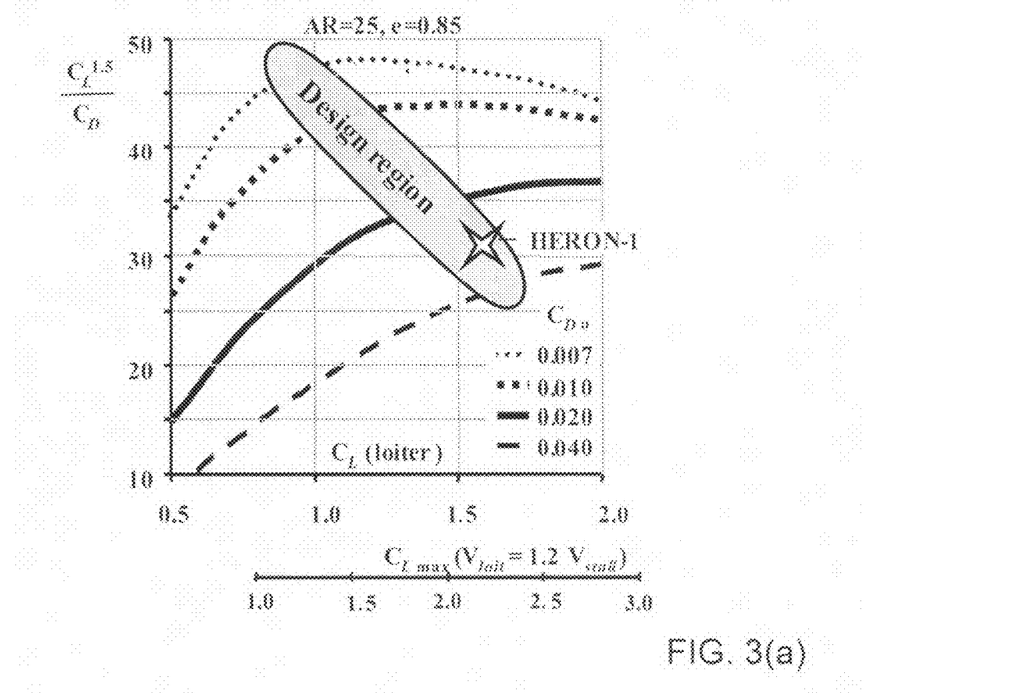
FIGS. 3(a) and 3(b) illustrate example design regions of long endurance UAV having high aspect ratio (AR=25) and moderate aspect ratio (AR=10), respectively.
Figure 3B:
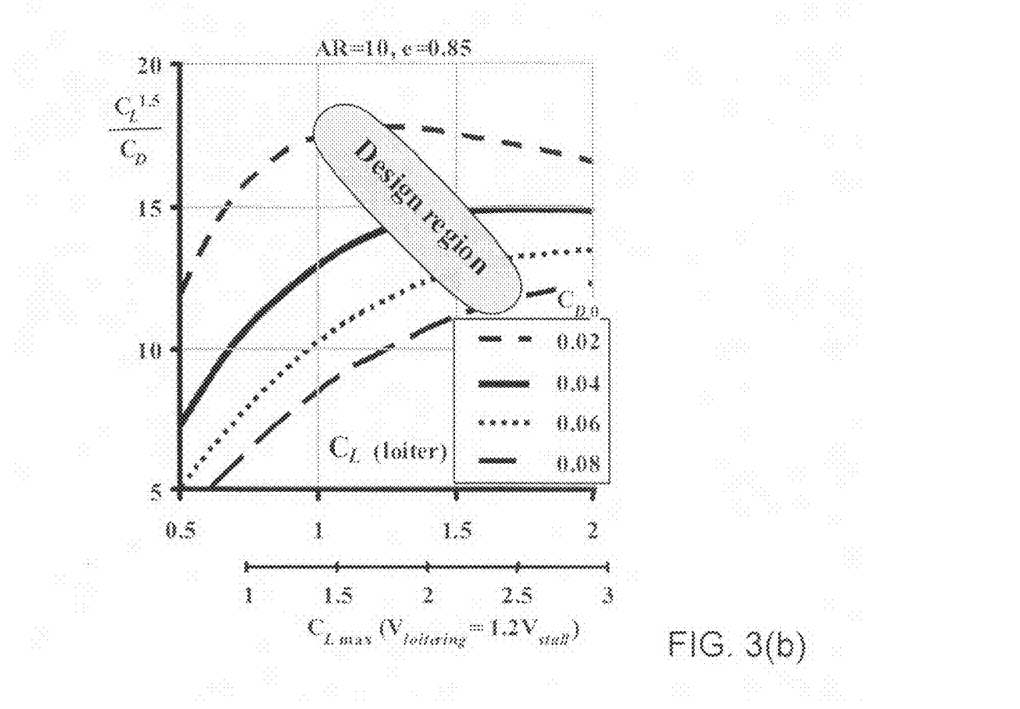

FIGS. 3(a) and 3(b), illustrate some variations of aircraft endurance factor ($C_L^{1.5}/C_D$) for the different levels of configuration parasite drag, and marks a general region therein generally relevant for UAV with high and moderate aspect ratio wings. For some cases of practical interest (for example, where there is increased parasite drag due to external installations, protruding payloads, engine-airframe integration, installation of cooling systems, etc.), there is a clear advantage of high-lift, loitering flight. However, with the need to impose a speed safety margin on the minimum loiter velocity $V_{loiter}=1.2V_{stall}$, the full potential for increased lift that may be generated when flying at lower velocities may not be achieved for such vehicle, in some state of the art air vehicles, particularly UAV's.

SUMMARY OF THE INVENTION

The present invention relates to high lift wings for aircraft, in particular fixed wing aircraft, and to aircraft comprising such wings.

The present invention relates to fixed wings based on single element, high-lift, mild stall airfoils (HL-MS airfoils) and on two-element, high-lift, mission adaptive slotted airfoils (SA-airfoils), and to aircraft comprising such wings.

The term "suction peak" refers herein to relatively fast flow acceleration at the leading edge of the airfoil, producing a spiky pressure distribution.

The term "blunt leading edge" refers herein to increased thickness and increased local radius of the forward portion of the airfoil that prevents formation of suction peak at high angles of attack and produces a rounded pressure distribution at the leading edge of the aerofoil.

Herein, the term "mild-stall airfoils" (MS-airfoils) refers to a class of airfoils characterized by the lift curve having a plateau range of lift coefficients at post-stall angles of attack followed by gradual decline of the lift at high post-stall angles of attack. The plateau range and the gradual decline correspond to a gradually developing trailing edge separation of the flow, until total separation of the airfoil is achieved. Accordingly, it is often possible to more or less maintain the lift generated by the wing at the level of maximum lift, or within about 10% for example, for a relatively wide range of post-stall angles of attack, typically at least about 5°, 6°, 7° or 8°.

Mild stall wings (MS-wings), i.e. wings based on MS aerofoils, may be beneficial for development of small and medium size UAV, or other types of aircraft, flying at reduced airspeeds in windy air. Possible relaxation of speed safety margin for these air vehicles may help to improve their endurance and take-off/landing performance, and allow a safe flight close to stall airspeeds. However, complete elimination of speed safety margin, which implies flight at stall/post-stall angles of attack to provide an extended flight envelope of UAV, is an approach not pursued in the prior art. After the establishment of stall, the aircraft becomes less controllable as the flow over the suction surface becomes more and more detached.

Conventional mild stall airfoils (MS-airfoils) show moderate values of maximum lift, and comprise a plateau-shaped region of lift coefficient variation with angle of attack, in which for a range of angles of attack at post-stall domain there is a nearly constant level of the lift generated by the aerofoil. The plateau region may be defined as extending for at least for about 5° after the angle of attack of maximum lift coefficient, with variation of maximum lift in the plateau region being within about 10% of the maximum lift coefficient $C_{l\ max}$.

Figure 13:
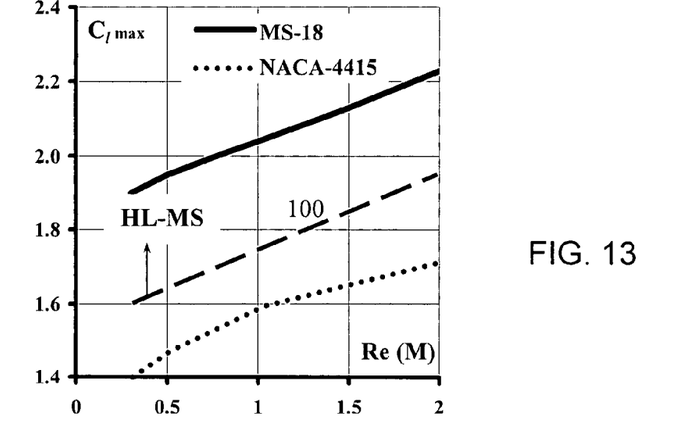
FIG. 13 schematic illustrates a $C_{l\ max}$ boundary between conventional and high-lift MS-airfoils, as a function of Reynolds number.

Herein, the term "High-Lift Mild-Stall airfoils" (HL-MS airfoils) refers to a special class of mild stall airfoils that, for any Reynolds number in the range of between about $0.3*10^6$ to about $2*10^6$, provide maximum lift $C_{l\ max}$ above the $C_{l\ max}$ for the same Reynolds number according to a minimum boundary line as defined by a linear variation between points of $C_{l\ max}=1.6$ at $Re=0.3\cdot 10^6$ and $C_{l\ max}=1.95$ at $Re=2.0\cdot 10^6$. This variation is illustrated in FIG. 13, and serves to differentiate HL-MS airfoils (providing high lift) from conventional mild stall airfoils (MS-airfoils) with moderate maximum lift, wherein conventional mild stall airfoils, such as for example NACA4415 and its derivatives, achieve maximum lift coefficient below this minimum boundary.

Figure 9:
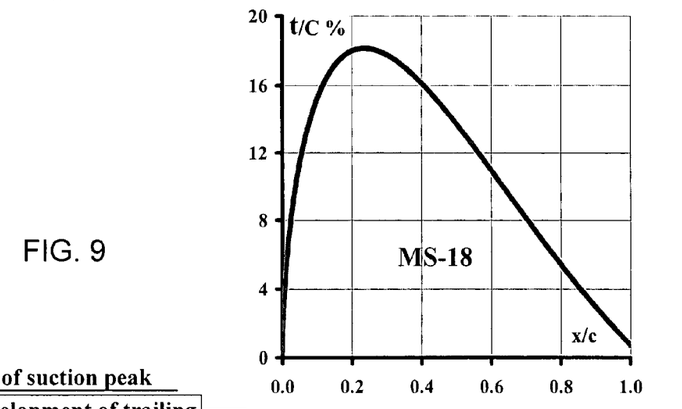
FIG. 9 schematically illustrates the thickness distribution of airfoil MS-18 along the chord thereof.

According to an aspect of the invention, maximum thickness to chord ratio may be at least 0.15 for HL-MS airfoils, for example. There are many ways to distribute thickness in HL-MS aerofoils, and FIG. 9 illustrates an example of one such distribution. Once the upper surface of HL-MS airfoil is designed for mild stall characteristics, one way of controlling or varying the maximum thickness and/or thickness distribution is by modification of the lower aerofoil surface.

Figure 8:
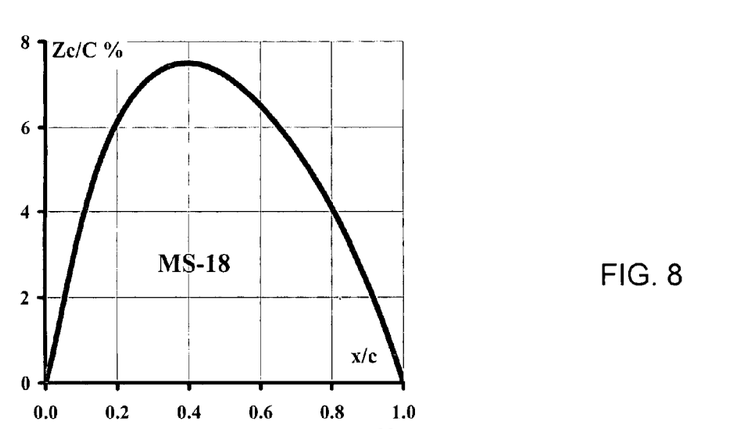
FIG. 8 schematically illustrates the camber distribution of airfoil MS-18 along the chord thereof.

According to an aspect of the invention, HL-MS airfoils may be highly cambered airfoils with maximum camber in the range of $(Zc/C)_{max}$ between about 5% and about 10%, and the HL-MS airfoils may have a substantially continuous and highly cambered aft portion of the upper surface, for example as illustrated in FIG. 8, for a design Reynolds number of Re=700K. (This is by way of example only, since aft camber of HL-MS airfoils according to the invention are expected to be lift and Reynolds number dependent, and is expected to vary, depending on design specifications.)

As with other MS-aerofoils, the plateau region of lift coefficients of HL-MS airfoils comprises a variation of the lift coefficient generally not exceeding 10% of $C_{l\ max}$ at stall and post-stall angles of attack, for at least about 5, 6, 7 or 8 degrees at the post stall range of angles of attack.

Thus, according to aspects of the invention, high lift mild stall airfoils (HL-MS airfoils) improve maximum lift with respect to corresponding MS-airfoils that may be designed for a similar design Reynolds number, while retaining and enhancing the feature of mild stall in the wide range of post-stall angles of attack. HL-MS airfoils comprise a relatively blunt leading edge that prevents formation of suction peak at high angles of attack and a relatively highly cambered aft portion of the airfoil that generates a relatively slowly creeping trailing edge separation, and the mechanism of high-lift, mild stall at stall and post-stall angles of attack can be explained by slowly creeping trailing edge separation and continuous lift build-up at the forward portion of the airfoil. The combination of continuous lift build-up at the forward portion of HL-MS airfoils with slowly progressing trailing edge separation produces the feature of mild stall at high level of maximum lift and provides significant advantage relative to conventional MS-airfoils.

Figure 7:
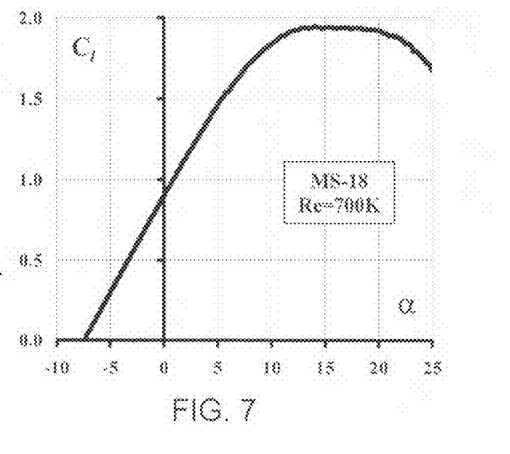
FIG. 7 illustrates lift coefficient distributions with angle of attack for airfoil MS-18, at Re=0.7*10$^6$.
Figure 12:
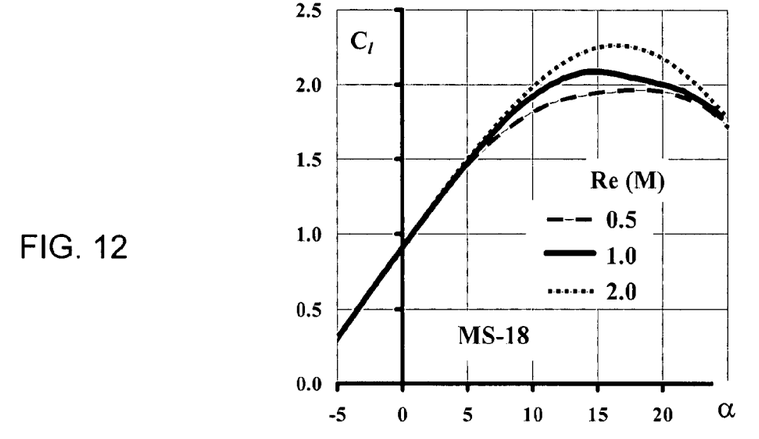
FIG. 12 illustrates the effect of Reynolds number on lift coefficient distributions with angle of attack for airfoil MS-18.

High-lift MS-airfoils according to aspects of the invention enable full velocity range up to stall velocity to be used in the range of Reynolds numbers of Re ~$0.5*10^6$ to about $2.0*10^6$ as shown in FIGS. 7 and 12, which is based on lift characteristics of HL-SA aerofoil designed for $Re=0.7*10^6$. For higher Reynolds numbers greater than about $2.0*10^6$, increased maximum lift of MS-airfoils comes with a gradual deviation from the feature of mild stall characteristics. For Reynolds numbers below Re~$05*10^6$, a special adjustment of airfoil's contours is required for a better integration with laminar separation bubble and for prevention of laminar stall. In this connection it may be noted that typical Reynolds numbers defined by the minimum airspeeds and wing chords of small and medium size UAV are Re ~$0.5$–$2.0*10^6$ or less than about $0.5*10^6$, where laminar-turbulent transition of boundary layers and other aspects of aerodynamics of low Reynolds numbers are normally accounted for in aerodynamic evaluation of an air vehicle.

HL-MS airfoils according to aspects of the invention may be considered attractive for development of the wings of small and medium size UAV flying at reduced airspeeds. However, the inventors have determined that in such cases, with increasing angle of attack, the stall which first develops at inboard portion of HL-MS wing, would progress across the span of the wing and produces eventually the stall of the tip region. These effects adversely affect the efficiency of ailerons at stall and post-stall angles of attack, apart from unfavorable effects associated with tip stall. For exclusively HL-MS wings, the speed safety margin may be somewhat relaxed but not completely eliminated, allowing the option of safe and controllable flight at stall and post-stall angles of attack.

Herein, the term "Slotted Airfoil" (SA-airfoils)—refers to two-element airfoils composed of a first element—the main aerofoil body, and a second element, in the form of a flap or aileron) segment. The second element of SA-airfoils is permanently separated from the main body by a slot which is substantially open for the airflow at any deflection of the flap, and the second element does not retract to a retracted position that results in the substantially closed aerodynamic contours of a single-element airfoil. A feature of this structure is that it facilitates actuation of the second element through positive or negative deflection angles. Another feature of this structure is that a box-like relatively rigid construction may be achieved. With the second aerofoil element optionally coupled to actuators, the SA-airfoils of the invention provide the features of adjustable geometry and have built-in options for operating as take-off/landing flaps, ailerons, airbrake and for providing decambering at maximum speed flight. SA-airfoils according to the invention are mission-adaptive, two-element, high-lift arrangements, and are inherently high-lift airfoils that are particularly suitable for development of long endurance UAV and other aircraft, loitering at high lift coefficients. According to one aspect of the invention, the basic SA-airfoil is designed for cruising/loitering flight at high lift coefficients, and optionally relies on a second element rotation around external hinge point for adjustment of the airfoil to different flight regimes.

SA-airfoils according to the invention are essentially high-lift wing sections, that benefit from the airflow through the slot of two-element arrangement to achieve high maximum lift. Positive flap deflections of the second element of these airfoils may produce a further enhancement of maximum lift, but this may be accompanied with some degradation of their stall characteristics.

According to some aspects of the invention, a wing is provided comprising at least a first portion thereof that is based on HL-ML aerofoils, and at least a second portion thereof that comprises a slotted aerofoil arrangement.

According to one aspect of the invention, a wing for an aircraft is provided, comprising at least a first wing portion configured for providing high-lift mild stall characteristics at least at Reynolds numbers in the range between about $0.3*10^6$ and about $2.0*10^6$, and at least a second wing portion comprising a substantially permanently slotted aerofoil arrangement. In illustrated embodiments, the first wing portion is an inboard portion with respect to said second portion. In particular, the first wing portion comprises high-lift, mild-stall airfoils (HL-MS airfoils), each said HL-MS airfoil having a maximum lift coefficient ($C_{l\ max}$) at a Reynolds number (R) between about $0.3*10^6$ and about $2.0*10^6$ that is substantially not less than a minimum value for the maximum lift coefficient ($(C_{l\ max})_{min}$) at said Reynolds number R according to the relationship:

$$(C_{l\ max})_{min} = (0.35/(1.7*10^6))*R + 1.6$$

The HL-MS airfoils may be configured for providing mild stall aerodynamic characteristics including a variation of lift coefficient ($C_l$) with angle of attack ($\alpha$) having a plateau region extending for at least for an $\alpha$ range of at least about 5°, with a variation of $C_l$ in said plateau region being within about 10% of the maximum lift coefficient $C_{l\ max}$ at a Reynolds number in the range between about $0.3*10^6$ and about $2.0*10^6$. The HL-MS airfoils may each comprise a thickness not less than about 15% of the chord thereof. The HL-MS airfoils may each comprise a relatively blunt leading edge configured for substantially preventing or reducing the size of leading edge suction peaks at stall or post-stall angles of attack. The HL-MS airfoils may each comprise a maximum camber not less than about 5% of the chord thereof. The HL-MS airfoils may be configured for providing relative high lift coefficient by comprising relative blunt leading edge section and optionally a highly cambered aft portion. The slotted aerofoils (SA aerofoil) are two element aerofoils, each SA aerofoil comprising a first aerofoil element comprising a leading edge of the SA aerofoil, separated by a permanent gap from a second aerofoil element comprising a trailing edge of the SA aerofoil. The second aerofoil elements may be pivotably movable with respect to corresponding said first aerofoil elements via a hinge point. The hinge point may be outwardly displaced with respect to an outer contour of said second aerofoil element. Optionally, the wing may further comprise a suitable actuation mechanism for deflecting said second aerofoil element in a positive or negative direction with respect to the first aerofoil element. The second aerofoil element may be adapted for operating as one or more of: flaps; ailerons; airbrake; and for providing decambering at maximum speed flight. The slot optionally comprises a width dimension at least 2% of the airfoil chord. Further optionally, the SA aerofoils are based on said HL-MS airfoils. Optionally, the SA aerofoils may be designed starting with a said HL-MS airfoil of required chord, providing a slot to divide the HL-MS airfoil into a two-element aerofoil, comprising a first aerofoil element comprising a leading edge of the HL-MS aerofoil, separated by said gap from a second aerofoil element comprising a trailing edge of the HL-MS aerofoil, and further displacing said second aerofoil element in an outward direction from the original position of the same within the HL-MS aerofoil contour.

In some embodiments, at Reynolds numbers in the range between about $0.3*10^6$ and about $2.0*10^6$, a maximum lift coefficient $(C_{l\ max})_2$ associated with said second wing portion may be greater than a $(C_{l\ max})_1$ associated with said first wing portion. In particular, $(C_{l\ max})_2$ may be at least 15% greater than $(C_{l\ max})_1$ for any Reynolds number at least within the range between about $0.3*10^6$ and about $2.0*10^6$.

Optionally, the wing may comprise one or more of the following: a substantially rectilinear leading edge; a substantially rectilinear trailing edge; a substantially trapezoidal planform.

Optionally, the first wing portion comprises a span of between about 40% to about 70% of a wing span of said wing. Further optionally, the second wing portion comprises a span of between about 30% to about 60% of a wing span of said wing.

The present invention also relates to an air vehicle comprising wings according to aspects of the invention. The wings may be the main lift-producing wings of said air vehicle. For example, the air vehicle may be an Unmanned Air Vehicle (UAV), in particular adapted for long range endurance and loitering. The air vehicle may be configured for operating at velocities at and beyond the stall velocity thereof, i.e., at post-stall angles of attack.

The present invention also relates to a method for operating an aircraft comprising:
 providing said aircraft with wings according to the invention;
 flying the aircraft at post-stall conditions.

The present invention also relates to a method for designing an aircraft wing, comprising:
 designing at least a first wing portion comprising first aerofoils configured for providing high-lift mild stall characteristics at Reynolds numbers in the range between about $0.3*10^6$ and about $2.0*10^6$; and
 designing at least a second wing portion comprising second aerofoils having a substantially permanently slotted aerofoil arrangement.

The present invention thus provides a HL-MS~SA composite wing, in which the wing may be operated at flight domains beyond the post stall domain of comparable HL-MS wings, ensuring flight safety and providing fully controllable flight up to high post stall angles of attack, which is not normally possible with HL-MS wings only. At the same time, the composite wing according to the invention provides improved lift coefficient that is possible with a purely SA design for the full wing, for relatively low angles of attack. The high maximum lift of SA-only wings allows cruising/loitering flight at reduced airspeeds and high lift coefficients, improving loitering performance of long endurance UAV, for example. However, because of their stall characteristics, the flight of SA-wings should comply, with standard speed safety margin $V_{flight} \geq 1.2 V_{stall}$, which limits their allowable flight envelope. In other words, while SA-only wings have relatively high lift characteristics, this is accompanied with abrupt stall characteristics, and can therefore only be operated with a stall safety margin at low speeds. This safety margin tends to erode the useable lift characteristics to those comparable with MS-HL wings, but without the latter's mild stall performance.

Providing a wing having an SA aerofoil based wing section and an HL-MS based wing section has features including improved load-carrying capabilities with respect to a fully HL-MS wing, though accompanied by the loss of mild stall characteristics and by the gain of maximum lift. The invention thus also provides a high-lift wing with mild stall characteristics and stall/post-stall flight capabilities, allowing elimination of speed safety margin and extension of available lift range.

The combination of high-lift MS-airfoils and two-element SA-airfoils in the same wing allows the elimination of speed safety margin, and thus provides the capability of controllable flight at stall and post-stall angles of attack.

Controllable flight at stall and post-stall angles of attack is attractive for many aircraft, in particular for improving UAV operational flexibility and for extending their flight capabilities.

The composite HL-MS/SA wing according to the invention provides a two-level sectional $C_{l\,max}$ limit across the span of the wing. The gradual stall of inboard wing portion (the stall of HL-MS airfoils) occurs when there is still fully attached airflow at the outboard SA-based wing portion, leaving sufficient margin for substantial increase of post-stall angles of attack, until the stall of this wing portion is achieved. This provides a practically unaffected efficiency of the ailerons at post-stall angles of attack, producing the feature of post-stall flight capabilities with fully controllable UAV. In an aircraft design comprising the wings of the invention, the aircraft design is generally complemented by the adequate tail design, allowing an extension of the aircraft (particularly when a UAV) operational limit up to the high post-stall angles of attack.

Thus, a feature of aspects of the present invention is that the aforesaid speed safety margin can be dispensed with, providing a capability of controllable high-lift flight in the wide range of post-stall angles of attack.

Other features of aspects of the invention include the following:

Unintended moderate stall of small UAV, comprising said HL-MS/SA-wings, when flying at reduced airspeeds in windy conditions does not produce severe asymmetric moments leading to the drop of a wing and development of dynamic spin modes, and thus enables controllable flight at stall conditions. In these cases, the UAV can benefit from mild-stall characteristics of its inboard HL-MS wing portion, and also from substantially unaffected efficiency of the slotted ailerons at stall and post-stall angles of attack and improved stall safety margin of its outboard SA wing portion. For HL-MS/SA wings, gradual deviation from linear lift characteristics close to maximum lift and at post-stall domain, produce beneficial nose-down pitching moments. Decrease of wing downwash in the tail area contributes further to this effect, producing a feature of "passive self recovery of the UAV" at stall/post stall angles of attack. Thus, the HL-MS/SA wing allows elimination of speed safety margin without compromising on flight safety of UAV.

Intended stall of HL-MS/SA-wing produces excessive drag associated with the stalling of the wing inboard section, while retaining high maximum lift. This regime may be used for improvement of descent performance (increase of glide angles) and enhancement of UAV maneuverability by eliminating the speed safety margin.

Intended stall of the MS/SA-wing at approach to landing helps to increase the glide angles of UAV (due to the drag of stalled MS-wing) and to reduce the approach airspeed by maximum exploitation of available maximum lift, thus enabling landing at controllable stall. This is achieved without substantially impairing aileron efficiency, and ensuring fully controllable UAV at approach to landing. For this case, the flare stage of the landing can be eliminated, supported by the adequate design of landing gear for this specific type of landing and design for required ground clearance lines.

The HL-MS/SA-wings may be beneficial in the deployment of a parafoil for point landing of a UAV. Mild stall characteristics and efficient roll control help to prevent the drop of the wing and avoid development of unfavorable dynamic response at initial stages of parafoil deployment The mild stall characteristics of HL-MS/SA-wings may also be useful for development of flight control for automatic take-off and landing. In this case, relaxed speed safety margins may be adopted for development of flight control laws, while retaining the required safety. Aileron effectiveness at the airspeeds close to stall may be important contributor to this development, complying with requirement of sufficient roll rate at take off/landing stages of a mission.

The high-lift MS/SA-wings may be useful in the development of maneuverable UAV. For example, maximum turn capabilities of the UAV may be improved by extending the allowable maneuverable lift up to the maximum lift of the wings, without considering speed safety margin and at the same time benefiting from the substantially unaffected efficiency of the ailerons, which is in contrast to the standard speed safety margin of $V_{flight} \geq 1.2\,V_{stall}$. Unintended stall of the UAV during maneuvering flight does not generally create a safety problem, allowing secure recovery of UAV from the domain of post-stall angles of attack.

Accordingly, relaxation, or elimination, of imposed speed safety margin ($V_{loiter}=1.2V_{stall}$) may be attractive for such cases, producing a number of features of operational UAV.

Note that aerodynamic characteristics of airfoils disclosed herein were estimated using MSES code, unless explicitly specified as results of wind tunnel testing.

BRIEF DESCRIPTION OF THE DRAWINGS

In order to understand the invention and to see how it may be carried out in practice, a number of embodiments will now be described, by way of non-limiting example only, with reference to the accompanying drawings, in which:

FIG. 15(a)—cruise, loiter mode; FIG. 15(b)—decambering mode for high speed flight; FIG. 15(c)—landing flap mode; FIG. 15(d)—airbrake mode; FIG. 15(e)—aileron mode.

DETAILED DESCRIPTION

According to aspects of the invention, high lift wings are provided for aircraft, in particular fixed wing aircraft. For the purpose of example, and referring to FIG. 2, such an aircraft is described herein as a fixed-wing aircraft, generally designated with numeral 1, of the regular subsonic/transonic configuration, having a fuselage section 2, main wings 10 (only the starboard wing (also referred to herein as a "wing half") is illustrated in this figure), tailplane 3, vertical stabilizer 4, and a propulsion system (not shown). However, the present invention is applicable to other types of aircraft, for example: gliders; subsonic/transonic aircraft having canards rather than a tailplane; general aviation aircraft, and so on. Furthermore, while the present invention finds particular application in UAV aircraft, the invention may also be applied to manned aircraft, mutatis mutandis, in particular to general aviation, sailplanes, subsonic transport, naval aviation, and so on.

Figure 2:
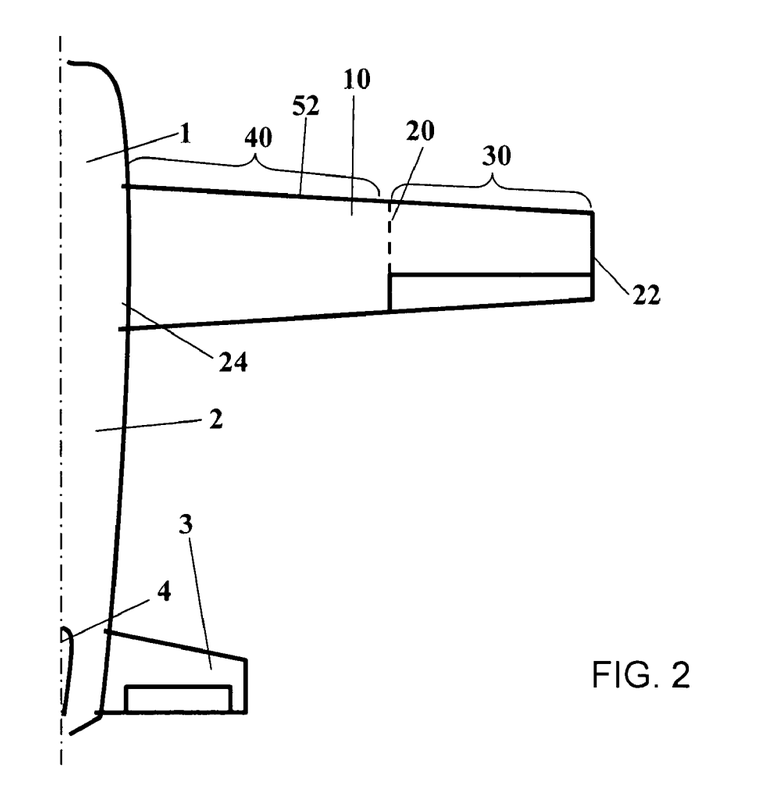
FIG. 2 schematically illustrates an aircraft comprising a wing according to one embodiment of the present invention.

According to the invention, each wing half 10 comprises an outboard section 30 joined to or integral with an inboard section 40. The outboard section 30 may be defined as extending from the wing tip 22 to a transition plane 20, while the inboard section 40 extends from the transition plane 20 to the wing root 24.

In the illustrated embodiment of FIG. 2, and by way of non-limiting example, the wing has a substantially trapezoidal plan shape, the leading edge 52 of the wing 10 being substantially rectilinear and having a substantially zero sweep angle, and the wing having a taper of 0.6 to about 1.0, between the root 24 and the tip 22. In other embodiments of the invention, the wing 10 may have a different plan form, for example: swept-back or swept forward, and/or with a different taper ratio (along the full wing, or different taper ratios for the inboard section and the outboard section); and/or having a different plan form, including curved leading edges and/or trailing edges such as an elliptical form, for example; and/or the inboard section and/or the outboard section may have a positive, negative or zero dihedral angle; and so on.

The inboard section 40 comprises a high-lift mild stall (HL-MS) configuration, while the outboard section 30 comprises a slotted aerofoil (SA) configuration, and the slotted aerofoil section extends up to and including the tip 22. This particular configuration provides root stall and avoids tip stall. In other variations of this embodiment, other arrangements of one or more HL-MS portions and SA portions along the length of the wing are possible. For example, there may be an HL-MS portion at the wing tip and another at the wing root, sandwiching an SA portion.

By way of non-limiting example, the transition plane 20 may be located at about 30% to about 60% of the wingspan from the wing tip 22 to the root 24, with the outboard section 30 being 30% to about 60% of the wingspan from the tip, and the inboard section 40 being about 70% to about 40% of the wingspan from the root.

The inboard section 40 comprises an aerofoil design that provides mild stall characteristics at a high level of maximum lift. By way of non-limiting example, and referring to FIG. 6, such an aerofoil design may have a thickness-to-chord ratio $(t/c)_{max}$ of about 18% at about 22% of the chord, and a camber distribution and a thickness distribution optionally as illustrated in FIGS. 8 and 9, respectively, having a maximum camber of about 7.5% at about 40% of the chord. This example aerofoil design is generally designated herein as MS-18. The leading edge 52 of the MS-18 aerofoil is relatively blunt or rounded, having a low curvature leading edge radius, and aft portion 54 of the airfoil is cambered (FIG. 6).

In particular, the aerofoil design of the inboard section 40 is such as to provide, for a required aircraft mission, payload, application, and so on, high lift characteristics coupled with mild stall characteristics for that section of the wing, when the inboard section 40 is considered substantially in isolation (that is, as if the whole wing were designed in a similar manner for providing high lift, mild stall characteristics along the wing span (ignoring edge effects at the wing tip and wing root)).

High lift, mild-stall airfoils (HL-MS-airfoils) according to aspects of the invention are generally characterized by relatively high maximum lift relative to conventional MS aerofoils (see for example FIG. 13), while retaining and enhancing mild stall characteristics in the wide range of post-stall angles of attack. HL-MS airfoils according to the invention rely on the blunt leading edge that prevents formation of suction peak at high angles of attack and on the highly cambered aft portion of the airfoil that produce the phenomena of slowly creeping trailing edge separation. The combination of continuous lift build-up at the forward portion of HL-MS airfoils with slowly progressing trailing edge separation produces the feature of mild stall at high level of maximum lift and provides significant advantage relative to conventional MS-airfoils.

Figure 6:
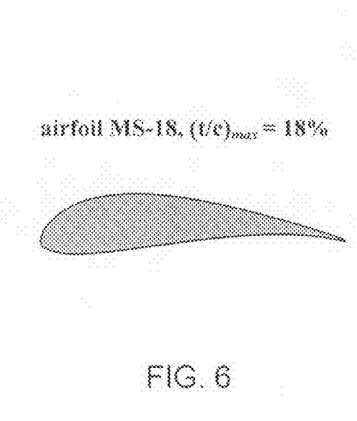
FIG. 6 schematically illustrates contour geometry of a high-lift, mild stall airfoil designated herein as MS-18.
Figure 10:
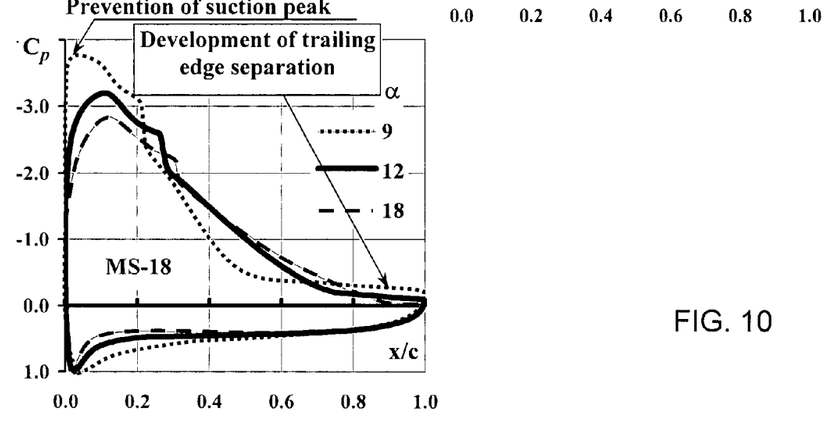
FIG. 10 illustrates pressure coefficient distributions along chord for airfoil MS-18 at stall and post-stall angles of attack.
Figure 11:
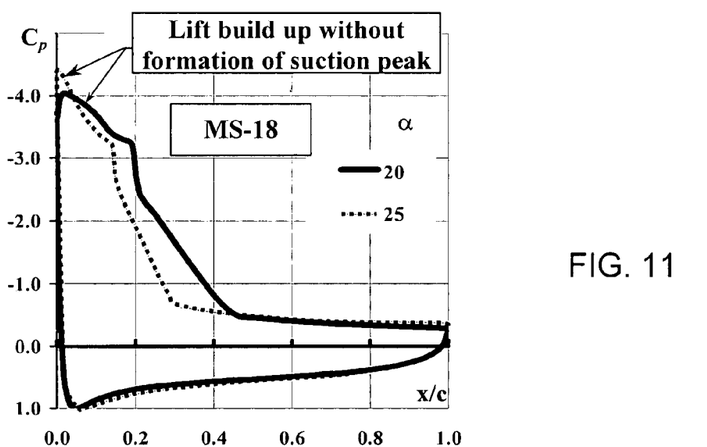
FIG. 11 illustrates pressure coefficient distributions along chord for airfoil MS-18 at high post-stall angles of attack.
Figure 14A:
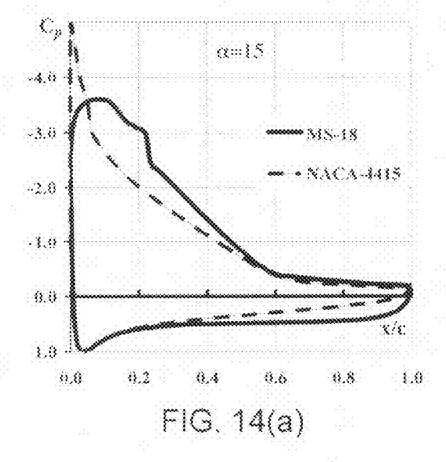
FIG. 14(a), 14(b) compare pressure coefficient distributions along chord of airfoils MS-18 and NACA-4415 at two post-stall angles of attack.
Figure 14B:
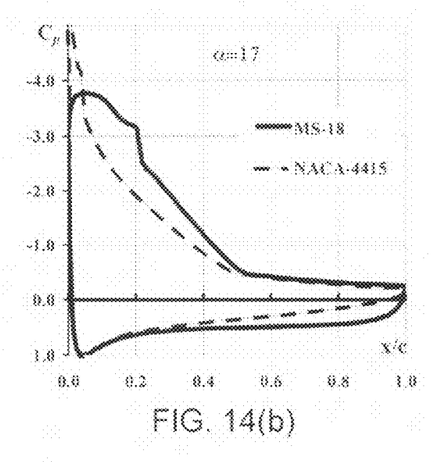

Referring again to the example aerofoil section (MS-18) illustrated in FIG. 6, such an aerofoil section may have a lift curve at design Reynolds number (Re=700K) such as for example illustrated in FIG. 7. FIGS. 10 and 11 illustrate nominal pressure distributions for this aerofoil section at stall and post-stall angles of attack α of 9°, 12° and 18°, and for high post-stall angles of attack α of 20° and 25°, respectively, for this aerofoil section. The variation of maximum lift and stalling characteristics with Reynolds number for the MS-18 aerofoil is illustrated in FIG. 12. FIG. 13 illustrates the variation of maximum lift coefficient ($C_{l\ max}$) as a function of Reynolds number for the MS-18 aerofoil, and compares this variation with the relatively inferior lift characteristics of a regular and standard mild stall aerofoil, such as the NACA-4415, the profile of which is illustrated in FIG. 4. FIGS. 14(a) and 14(b) compare the pressure distributions obtained with a MS-18 aerofoil according to the invention and the conventional mild stall NACA-4415 aerofoil, at angles of attack α of 15° and 17°, respectively, and it may be seen that the MS-18 aerofoil provides in each case more lift coupled with mild stall characteristics.

Furthermore, FIG. 13 delineates a schematic boundary 100 between the $C_{l\ max}$~Re characteristics of reference, conventional mild stall airfoils and the corresponding characteristics of high-lift, mild-stall airfoils (HL-MS airfoils) according to the invention. This boundary thus defines a lower limit for $C_{l\ max}$ obtained with a particular HL-ML aerofoil design at any particular Reynolds number (Re) between about $0.3*10^6$ and about $2.0*10^6$. The boundary 100 may be considered to suggest or approximate a linear minimal relationship between $C_{l\ max}$ and Re between these upper and lower Reynolds number limits, and the boundary 100 can thus be described by the relationship $$(C_{l\ max})_{min}=(0.35/(1.7*10^6))*Re+1.6,$$
$$[0.3*10^6<Re<2.0*10^6] \quad \text{Eq. 1}$$

The HL-MS aerofoil sections for the inboard section 40 may be designed in any suitable manner, such as to provide suitable $C_{l\ max}$~Re characteristics at or exceeding that suggested by Eq. 1 above. For example, it is possible to start with a known MS aerofoil design that may be close in characteristics to that required, for example camber, thickness to chord ration, and so on. Alternatively, a baseline aerofoil may be designed using known methods. Then, the baseline aerofoil contour may be modified to provide a relatively blunt leading edge to obtain high lift, and a suction surface that is cambered and/or has a thickness distribution such as to provide slowly creeping trailing edge separation. CFD methods may be used to test the aerofoil, which can then be modified further, and again tested. A number of such trial and error iterations may be carried out until a suitable profile for the aerofoil, providing the required characteristics, is achieved.

Figure 15:
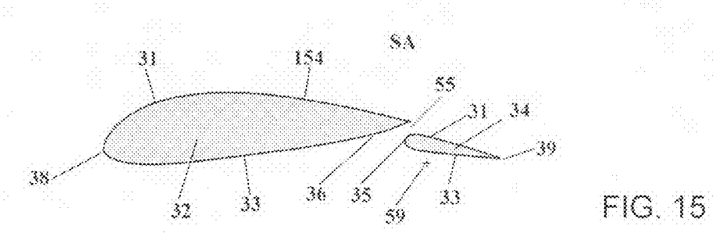
FIG. 15 illustrates a mission-adaptive, adjustable geometry, two-element airfoil according to an embodiment of the invention; one particular form of this embodiment, designated herein SA-19 is illustrated in FIGS. 15(a) to 15(e) in various modes of operation.
Figure 15A:
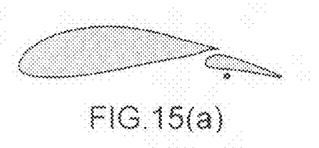
Figure 15B:
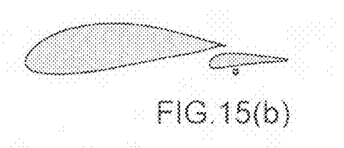
Figure 15C:
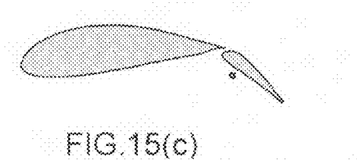
Figure 15D:
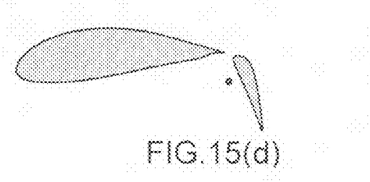
Figure 15E:
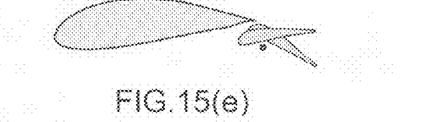

According to the invention, and referring also to FIG. 15, the outboard section 30 is configured as a two-element slotted aerofoil (SA aerofoil), having a substantially static primary element 32 and a pivotable secondary element 34. The primary element 32 comprises the leading edge 38 of the aerofoil, and a major portion of the suction surface 31 and pressure surface 33 thereof. The secondary element 34 comprises the trailing edge 39 of the aerofoil, and a minor portion of the suction surface 31 and pressure surface 33 thereof. A slot 55 separates the leading portion 35 of the secondary element 34 from the trailing portion 36 of the primary element 32. For example, the slot 55 may have a width at least 2% of the airfoil chord in a non-deflected position of the flap element.

The precise form of the slot 55 generally depends on the particular mode of operation of the wing 10, as illustrated, for example, in FIGS. 15(a) to 15(e) which refer to cruise/loiter, maximum speed decambering, landing flap mode, airbrake mode and aileron configurations, respectively. Optionally, the hinge point 59 of the secondary element 34 is outwardly displaced with respect to the lower (pressure) surface of the secondary element 34.

By way of non-limiting example, and referring to FIGS. 15(a) to 15(e), such an SA aerofoil design may have a suitable thickness-to-chord ratio $(t/c)_{max}$, a camber distribution and a thickness distribution, optionally similar to the corresponding characteristics of the HL-MS inboard section. This example aerofoil design is designated herein as SA-19, and the leading edge 152 of the SA-19 aerofoil may also optionally be relatively blunt or rounded, having a low curvature leading edge radius, and aft portion 154 of the airfoil may also be cambered.

Figure 16:
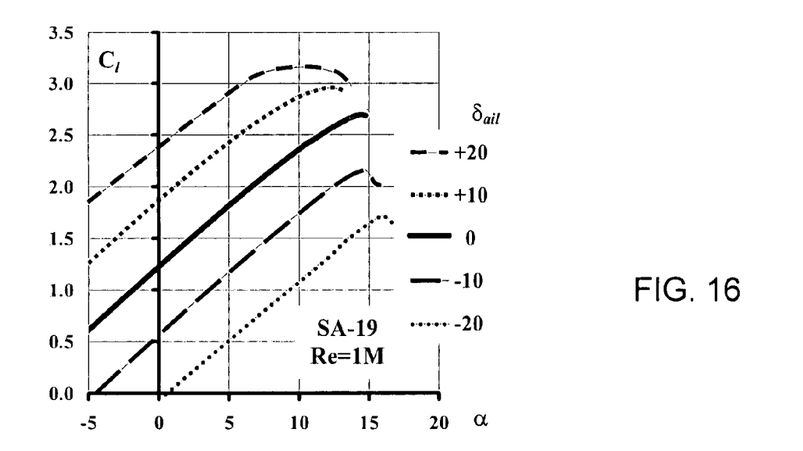
FIG. 16 compares lift coefficient distributions with angle of attack for airfoil SA-19, for a range of deflections of the second aerofoil element, at Re=1M.
Figure 17:
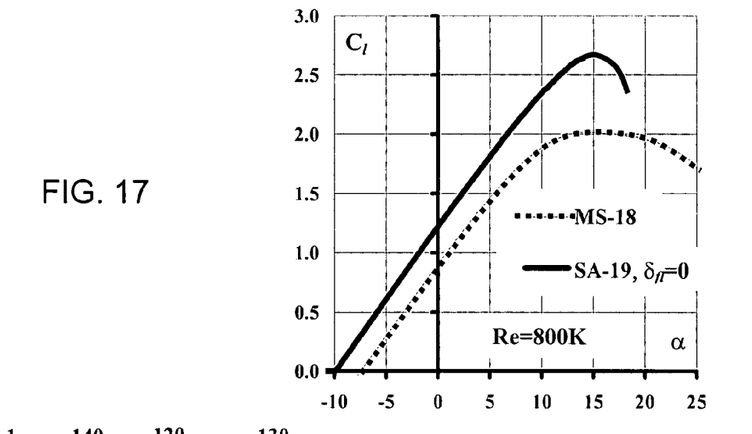
FIG. 17 compares lift coefficient distributions with angle of attack for airfoils MS-18 and SA-19, at Re=0.8·10$^6$.

Referring again to the example aerofoil section (SA-19) illustrated in FIGS. 15(a) to 15(e), the airflow through slot 55 provides enhanced efficiency and linearity of the aerodynamic characteristics of the aerofoil as compared to a similar non-slotted aerofoil, though more abrupt stall characteristics, and in FIG. 17 the variation of $C_1$ with angle of attack α obtained with the SA-19 aerofoil is compared to that of the MS-18 aerofoil, at Re of about $0.8*10^6$. Referring to FIG. 16, the variation of $C_1$ with angle of attack α obtained with the SA-19 aerofoil is shown for a variety of angle of attack δ of the secondary element 34 (with respect to the first element) at Re of about $10^6$.

In other embodiments of the invention, the secondary element 34 is spatially and/or rotationally fixed with respect to the primary element 32, and optionally, the secondary element 34 may comprise control surfaces such as ailerons, flaps and so on, that are pivotable with respect to the secondary element 34.

Figure 19A:
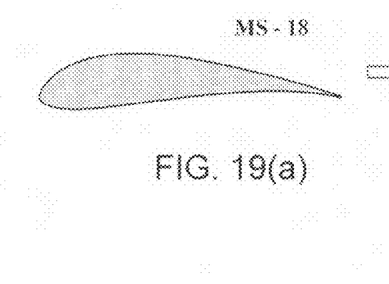
FIGS. 19(a) and 19(b) schematically illustrate the transformation of an MS-airfoil (MS-18) into a corresponding SA airfoil (designated MS/SA-18).
Figure 19B:
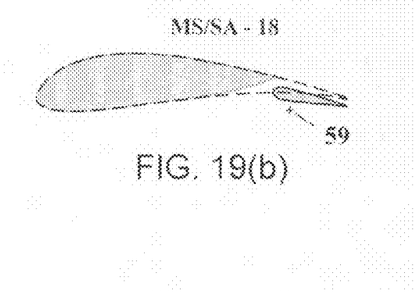

Referring in particular to FIGS. 19(a) and 19(b), in a first embodiment of the invention, the inboard section 40 comprises high lift, mild stall single element aerofoil sections, and the outboard section 30 comprises a slotted double element aerofoil configuration that is based on the single element aerofoil section of the inboard section 40. Thus, as will become clearer herein, the inboard section 30 and the outboard section 40 are provided with substantially similar profiles at least from the leading edge 52, 38 to at least a aft portion 54, 154 of the aerofoils thereof. By way of non-limiting example, the inboard section 40 may comprises a MS-118 aerofoil profile, as illustrated in FIGS. 6 and 19(a), and referring to FIG. 19(b), the outboard section 30 comprises a two-element aerofoil profile, designated herein as MS/SA-18, in which the primary element has a profile substantially identical to that of the MS-18 aerofoil for the leading edge, and the suction and pressure surfaces up to the slot 55. The profile of the suction and pressure surfaces of the secondary element may be similar to that of a corresponding part of the MS-18 aerofoil close to the leading edge thereof, but displaced with respect to said corresponding part of the MS-18 profile, indicated as phantom lines in FIG. 19(b). Thus, in this embodiment, the wing has a substantially smooth profile from wing tip to wing root.

The wing 10 according to this embodiment may be designed as follows. First, the basic HL MS aerofoil section for the wing is designed according to criteria such as aircraft mission profile, payload, cruise speed, and so on, for example, and the aerofoil section is scaled to provide wing tip and wing root HL MS aerofoils. A baseline wing is then defined by connecting wing root and wing tip HL MS aerofoils of a particular design (in this case the MS-18 design, as an example), via straight forming lines defining the leading edge and trailing edge of the wing, according to the taper ratio, sweep and so on. Then, a transition plane is defined along the span, for example about 30% to about 60% from the wing tip, essentially dividing the wing into the inboard section 40 and the outboard section 30. The aerofoil sections for the outboard section 30 are then modified to include a slot separating a trailing or secondary element that may be used as an aileron, flap, and so on, from a leading or primary element, of the now-two-element aerofoil. A hinge point is defined for the secondary element outside of the aerodynamic contour of the two element aerofoil, such as to enable the slot to be defined for a wide range of angles of attack, particularly positive angles of attack typical of low speed flight. Optionally, further modifications of the two-element aerofoil geometry may be made at the aerodynamic design and development stages of the wing, and such modifications may include, for example, shaping of the secondary element and fairing the trailing portion of the primary element of the aerofoil.

Figure 20:
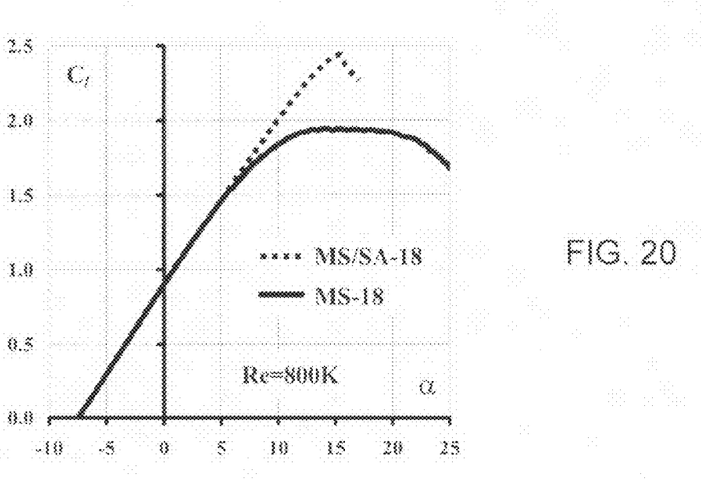
FIG. 20 compares lift coefficient distributions with angle of attack of mild stall airfoil MS-18 and slotted airfoil MS/SA-18, at Re=800K.

FIG. 20 compares the variations of $C_l$ with angle of attack a obtained with the high-lift, mild stall, single-element airfoil MS-18 and with the two-element MS/SA-18 airfoil. While the $C_l$~$\alpha$ characteristics are substantially identical at low and negative angles of attack $\alpha$, the MS/SA-18 airfoil shows a loss of mild-stall characteristics and an increase of its lift-carrying capabilities with respect to the single element MS-18 aerofoil.

Figure 21:
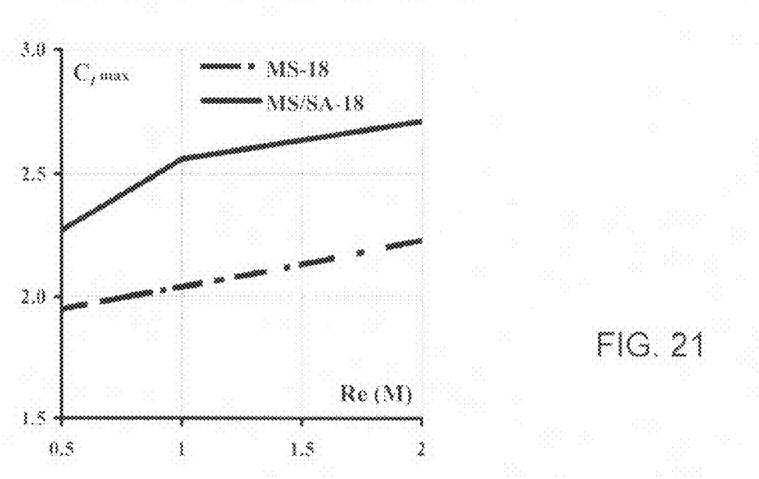
FIG. 21 compares maximum lift coefficient characteristics of airfoils MS-18 and MS/SA-18 as a function of Reynolds number.

FIG. 21 compares the variations of lift coefficient of an aircraft $C_{L\ max}$ with Reynolds number, the aircraft comprising with the high-lift, mild stall, single-element airfoil MS-18 and with the two-element MS/SA-18 airfoil. These figures can be regarded as illustrating a change in aerodynamic characteristics accompanying the transformation of an MS-type airfoil into SA-type airfoil. As may be seen in this figure, the effective operational limit (OL) for the aircraft is at an angle of attack $\alpha$ of about 17 or 18 degrees, with substantially unaffected aileron and elevator/rudder power at least up to this level of $\alpha$.

Without being bound by theory, the resulting MS/SA-wing with the inboard MS section and the outboard SA section, according to aspects of the invention, provides mild-stall characteristics at post-stall angles of attack due to beneficial effect of HL-MS airfoils of its inboard portion and capability of SA-airfoils of the outboard wing part to retain attached flow and unaffected efficiency of the ailerons at post-stall angles of attack.

Figure 22:
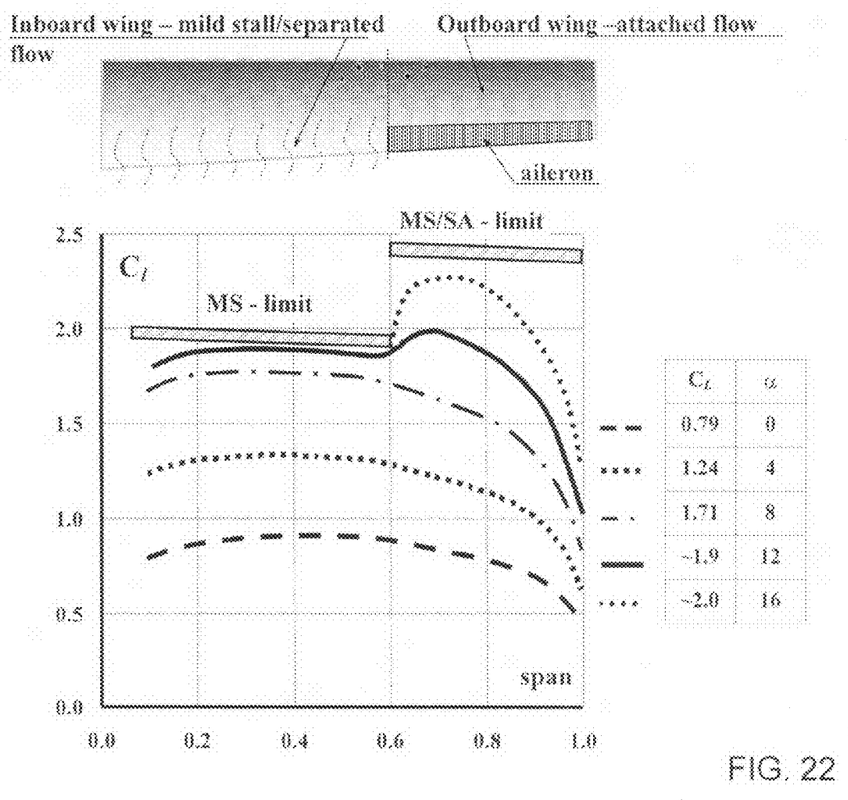
FIG. 22 illustrates spanload lift coefficient distributions and stall pattern of representative MS/SA wing.

Spanload distributions of a typical high-lift MS/SA-wing at different lift coefficients and angles of attack are shown in FIG. 22. The mild decrease of the local lift from the wing root 24 to transition plane 20 towards the outboard wing is due to the chosen taper ratio of the wing 10, taking into account to the aerodynamics of the mild-stall/slotted aerofoil wing 10. Stall of the wing 10 develops through the following stages:

- at the linear range of lift coefficients (angle of attack $\alpha$<about 12°), the wing 10 shows maximum sectional loading at its inboard section 40. This inboard section 40 first experiences the limit of maximum sectional lift defined by the characteristics of the HL-MS airfoils, triggering slow development of the stall at this wing portion.
- as angle of attack $\alpha$ is further increased, this induces mild stall of the inboard section 40, without substantially affecting the maximum lift of the wing 10. The outboard wing portion 30 maintains an attached flow, with significant margin between maximum sectional lift limit and actual local loading at this wing portion. Moderate taper ratio of wing 10 can contribute to increased margin (generally independent of the characteristics of SA-airfoils), producing a reduced loading of outboard wing portion.
- with a further increase in the angles of attack $\alpha$, there is a gradual development of mild stall on the inboard portion of the MS/SA-wing. This is accompanied by continuous lift build-up on the outboard wing portion 30, until this part of the wing reaches its maximum lift limit defined by the characteristics of slotted airfoils of the invention.

Figure 23:
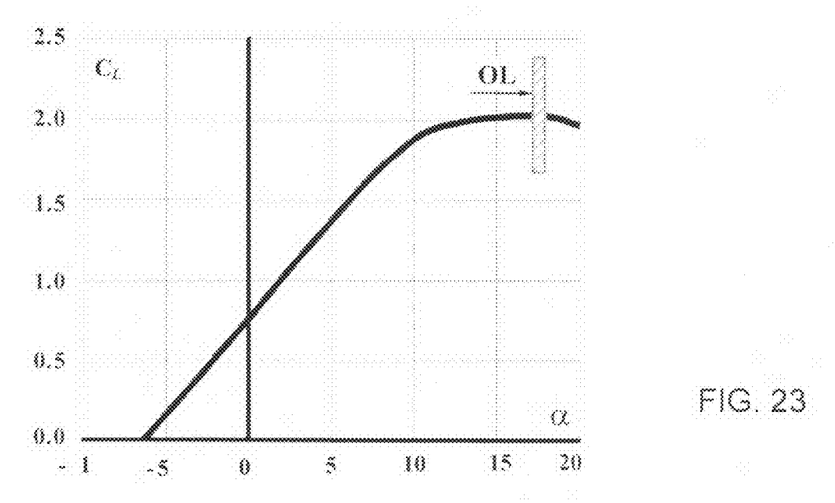
FIG. 23 illustrates aircraft lift coefficient variation with angle of attack, and operational limit of MS/SA wing of FIG. 22, up to which there is substantially unaffected aileron and elevator/rudder power for the aircraft.

The resulting lift curve of the wing 10 may provide almost constant lift at post-stall angles of attack, up to the stall of its outboard portion, as shown in FIG. 23.

The attached airflow at the outboard wing at post-stall angles of attack facilitates sufficient, and preferably substantially unaffected efficiency of aileron operation and provides the required controllability for the wing with fully developed stall at the inboard wing section 30. This stall pattern of the MS/SA-wing according to the invention provides a capability for controllable flight at stall and post-stall angles of attack. Correspondingly, the design of the tail should be adequate to provide sufficient control power of tailplane 3 and rudder 4 at high post-stall angles of attack, and to provide sufficient elevator efficiency to the tailplane 3 to trim the increased pitch-down moments of MS/SA wing of the invention at post-stall angles of attack.

Figure 18:
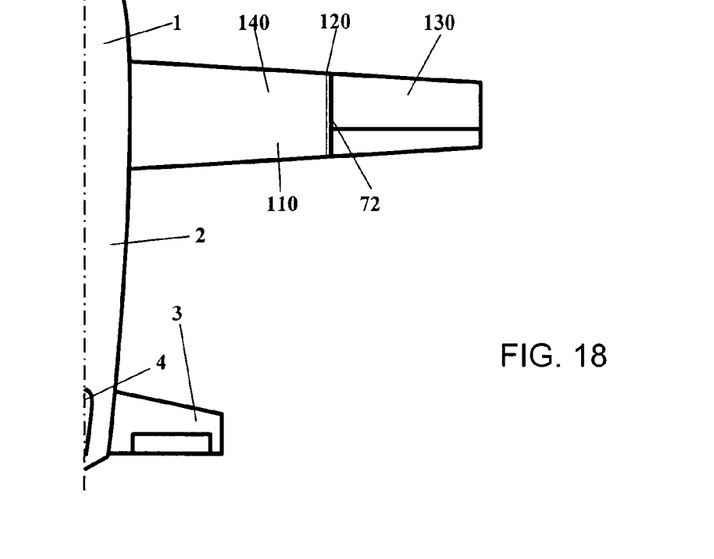
FIG. 18 schematically illustrates an aircraft comprising a wing according to another embodiment of the present invention.

A second embodiment of the invention is substantially similar to the first embodiment as described herein, *mutatis mutandis*, and thus a wing 110 according to the second embodiment also comprises a first wing section 140 based on HL-MS aerofoils, and a second wing section 130 based on SA-aerofoils. However, in the second embodiment of the invention, and referring to FIG. 18, the profile of the outboard section is not based on that of the inboard section. For example, the inboard section may have a profile such as the aforesaid MS-18 aerofoil, while the outboard section has another profile, such as the SA-19 two element aerofoil for example. In such a case, there may be a discontinuity in the profile of the wing at the transition plane 120. Optionally, a plate 72 aligned generally orthogonally to the planform of the wing and also generally aligned with the direction of the flow over the wing 110 may be provided at the transition plane to separate the airflow between the HL-MS and the SA sections of the wing 110.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed certain embodiments in accordance with the invention, it will be appreciated that many changes may be made therein without departing from the spirit of the invention.

The invention claimed is:

1. A wing for an aircraft, comprising at least a first wing portion configured for providing high-lift mild stall characteristics at least at Reynolds numbers in the range between about $0.3*10^6$ and about $2.0*10^6$, said first wing portion having a first sectional limit, and at least a second wing portion comprising a substantially permanently slotted aerofoil arrangement, said second wing portion having a second sectional limit, wherein said second sectional limit is higher than said first sectional limit.

2. A wing according to claim 1, wherein said first wing portion is an inboard portion with respect to said second portion.

3. A wing according to claim 1, wherein said first wing portion comprises high-lift, mild-stall airfoils (HL-MS airfoils), each said HL-MS airfoil having a maximum lift coefficient ($C_{l\ max}$) at a Reynolds number (R) between about $0.3*10^6$ and about $2.0*10^6$ that is substantially not less than a minimum value for the maximum lift coefficient (($C_{l\ max})_{min}$) at said Reynolds number R according to the relationship:

$$(C_{l\ max})_{min} = (0.35/(1.7*10^6))*R + 1.6.$$

4. A wing according to claim 3, wherein said HL-MS airfoils are configured for providing mild stall aerodynamic characteristics including a variation of lift coefficient ($C_l$)

with angle of attack ($\alpha$) having a plateau region extending for at least for an $\alpha$ range of at least about 7°, with a variation of $C_l$ in said plateau region being within about 5% of the maximum lift coefficient $C_{l\,max}$ at a Reynolds number in the range between about $0.3*10^6$ and about $2.0*10^6$.

5. A wing according to claim 3, wherein said HL-MS airfoils each comprise a thickness not less than about 15% of the chord thereof.

6. A wing according to claim 3, wherein said HL-MS airfoils each comprise a relatively blunt leading edge configured for substantially preventing or reducing the size of leading edge suction peaks at stall or post-stall angles of attack.

7. A wing according to claim 3, wherein said HL-MS airfoils each comprise a maximum camber not less than about 5% of the chord thereof.

8. A wing according to claim 3, wherein said HL-MS airfoils are configured for providing relative high lift coefficient by comprising relative blunt leading edge section and optionally a highly cambered aft portion.

9. A wing according to claim 1, wherein said permanently slotted aerofoil arrangement comprises slotted aerofoils (SA aerofoils), each said SA aerofoil being a two element aerofoil, each SA aerofoil comprising a first aerofoil element comprising a leading edge of the SA aerofoil, separated by a permanent gap from a second aerofoil element comprising a trailing edge of the SA aerofoil.

10. A wing according to claim 9, wherein said second aerofoil elements are pivotably movable with respect to corresponding said first aerofoil elements via a hinge point.

11. A wing according to claim 10, wherein said hinge point is outwardly displaced with respect to an outer contour of said second aerofoil element.

12. A wing according to claim 10, further comprising a suitable actuation mechanism for deflecting said second aerofoil element in a positive or negative direction with respect to the first aerofoil element.

13. A wing according to claim 10, wherein said second aerofoil element is adapted for operating as one or more of: flaps; ailerons; airbrake; and for providing decambering at maximum speed flight.

14. A wing according to claim 9, wherein said slot comprises a width dimension at least 2% of the airfoil chord.

15. A wing according to claim 9, wherein said SA aerofoils are based on said HL-MS airfoils.

16. A wing according to claim 15, wherein said SA aerofoils are based on said HL-MS airfoil of required chord, said two-element aerofoil, comprising a first aerofoil element comprising a leading edge of the HL-MS aerofoil, separated by said gap from a second aerofoil element comprising a trailing edge of the HL-MS aerofoil, and said second aerofoil element being displaced in an outward direction from an original position of the same within the HL-MS aerofoil contour.

17. A wing according to claim 1, wherein, at Reynolds numbers in the range between about $0.3*10^6$ and about $2.0*10^6$, a maximum lift coefficient $(C_{l\,max})_2$ associated with said second wing portion is greater than a $(C_{l\,max})_1$ associated with said first wing portion.

18. A wing according to claim 17, wherein $(C_{l\,max})_2$ is at least 15% greater than $(C_{l\,max})_1$ for any Reynolds number at least within the range between about $0.3*10^6$ and about $2.0*10^6$.

19. A wing according to claim 1, comprising a substantially rectilinear leading edge.

20. A wing according to claim 1, comprising a substantially rectilinear trailing edge.

21. A wing according to claim 1, comprising a substantially trapezoidal planform.

22. A wing according to claim 1, wherein said first wing portion comprises a span of between about 40% to about 70% of a wing span of said wing.

23. A wing according to claim 1, wherein said second wing portion comprises a span of between about 30% to about 60% of a wing span of said wing.

24. A wing according to claim 2, wherein said wing is configured for providing pre-stall characteristics for said second wing portion concurrently with said first wing portion providing wing loading at said first sectional limit, for at least a portion of a first range of angle of attack for said wing.

25. A wing according to claim 24, wherein said first range of angle of attack is between about 12° and about 16°.

26. A wing according to claim 24, wherein said wing is configured for providing aerodynamic lift wherein said first wing portion is in mild stall, and said second wing portion is in pre-stall.

27. A wing according to claim 1, wherein said first sectional limit is about 2 and said second section limit is about 2.5.

28. A wing according to claim 1, wherein said second sectional limit is about 25% higher than said first sectional limit.

29. A wing according to claim 1, wherein said first sectional limit comprises a first spanwise distribution of maximum lift coefficient corresponding to individual aerofoil sections along said first wing portion, and wherein said second sectional limit comprises a second spanwise distribution of maximum lift coefficient corresponding to individual aerofoil sections along said second wing portion.

30. An air vehicle comprising wings according to claim 1.

31. An air vehicle according to claim 30, wherein said wings are the main lift-producing wings of said air vehicle.

32. An air vehicle according to claim 30, wherein said air vehicle is an Unmanned Air Vehicle (UAV).

33. An air vehicle according to claim 32, wherein said UAV is adapted for long range endurance and loitering.

34. An air vehicle according to claim 30, wherein said air vehicle is configured for operating at velocities at and beyond the stall velocity thereof.

35. A method for operating an aircraft comprising:
(a) providing said aircraft with wings according to claim 1;
(b) flying the aircraft at post-stall conditions.

36. A method for designing an aircraft wing, comprising:
(i) designing at least a first wing portion comprising first aerofoils configured for providing high-lift mild stall characteristics at Reynolds numbers in the range between about $0.3*10^6$ and about $2.0*10^6$, said first wing portion having a first sectional limit;
(ii) designing at least a second wing portion comprising second aerofoils having a substantially permanently slotted aerofoil arrangement, said second wing portion having a second sectional limit; and
(iii) designing said at least first wing portion and said at least a second wing portion such that said second sectional limit is higher than said first sectional limit.

* * * * *